(12) United States Patent
Mackin et al.

(10) Patent No.: US 7,874,899 B2
(45) Date of Patent: Jan. 25, 2011

(54) UNLOAD RATE CONTROL FOR AN UNLOADING SYSTEM IN AN AGRICULTURAL HARVESTER

(75) Inventors: Ryan Patrick Mackin, Milan, IL (US); Daniel James Burke, Cordova, IL (US); Bruce Alan Coers, Hillsdale, IL (US); Mark Charles DePoorter, Coal Valley, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/467,508

(22) Filed: May 18, 2009

(65) Prior Publication Data
US 2010/0287899 A1    Nov. 18, 2010

(51) Int. Cl.
*A01D 17/02* (2006.01)
*A01F 12/46* (2006.01)

(52) U.S. Cl. ..................................... 460/114
(58) Field of Classification Search .................. 460/114, 460/119, 149; 414/523, 345, 389, 312; 56/14.6
See application file for complete search history.

(56) References Cited

U.S. PATENT DOCUMENTS

| | | | | | |
|---|---|---|---|---|---|
| 3,677,540 | A | * | 7/1972 | Weiss | 222/23 |
| 4,717,308 | A | * | 1/1988 | Kuhns | 414/307 |
| 5,424,957 | A | * | 6/1995 | Kerkhoff et al. | 700/240 |
| 5,518,453 | A | * | 5/1996 | Tribbett | 460/1 |
| 5,575,316 | A | * | 11/1996 | Pollklas | 141/198 |
| 5,749,783 | A | * | 5/1998 | Pollklas | 460/119 |
| 6,012,272 | A | * | 1/2000 | Dillon | 56/14.6 |
| 6,339,917 | B1 | * | 1/2002 | Dillon et al. | 56/14.6 |
| 6,594,979 | B2 | * | 7/2003 | Krone et al. | 56/16.6 |
| 6,848,243 | B2 | * | 2/2005 | Carr et al. | 56/10.2 R |
| 6,981,833 | B2 | * | 1/2006 | Guhr et al. | 414/312 |
| 7,343,726 | B2 | * | 3/2008 | Hettiger et al. | 56/16.6 |
| 2007/0084378 | A1 | * | 4/2007 | Creighton et al. | 105/247 |
| 2010/0009731 | A1 | * | 1/2010 | Coers et al. | 460/1 |

* cited by examiner

*Primary Examiner*—Árpád Fábián-Kovács

(57) ABSTRACT

An agricultural harvester includes a support frame and a hopper coupled to the support frame. The hopper is configured to store an agricultural product during a harvesting operation. An unloading system is coupled to the support frame. The unloading system is configured to transport agricultural product received from the hopper to an off-machine location. The unloading system includes a metering gate, a transfer conveyance, at least one sensor, and an electrical processing circuit. The metering gate is positioned near a bottom of the hopper and in communication with an interior of the hopper. The transfer conveyance has an inlet end and a discharge end. The inlet end is in communication with the metering gate. The at least one sensor provides an output signal representing an operating parameter associated with an unload rate of agricultural product through the transfer conveyance during an unloading operation. The electrical processing circuit is coupled to the metering gate and the at least one sensor. The electrical processing circuit controls a position of the metering gate, dependent upon the output signal.

14 Claims, 4 Drawing Sheets

UNLOAD RATE CONTROL FOR AN UNLOADING SYSTEM IN AN AGRICULTURAL HARVESTER

FIELD OF THE INVENTION

The present invention relates to agricultural harvesters, and, more particularly, to unloading systems for such harvesters.

BACKGROUND OF THE INVENTION

Agricultural work machines, such as combines, are employed in the agricultural industry for various tasks, including harvesting crops. During harvesting operations, typical such agricultural work machines move through a crop field while operating a header at the front of the work machine, to cut or gather the crop. The agricultural product, e.g., grain, is then removed from the non-grain crop materials by threshing, separating and cleaning assemblies on the work machine, and then the grain is transferred to the work machine's hopper for temporary storage.

At various times during harvesting operations, such as when the work machine's hopper is full, the operator of the work machine will unload the agricultural product from the work machine using a cantilevered unloading system that is mounted on the work machine. Typically, the agricultural product is unloaded via the unloading system into a mobile agricultural product carrier, such as a tractor pulled hopper wagon (grain cart), a truck, or a tractor-frailer, which delivers the agricultural product to a storage facility or to another transport system. At times, the mobile agricultural product carrier may travel beside the work machine during simultaneous harvesting and unloading operations. Typically, the cantilevered unloading system pivots to swing away from a stowed position to a fixed pivot position, and some systems may be manually adjusted from the fixed pivot position with respect to the fore/aft (lengthwise) position of the unloading point. However, this arrangement limits an operator's ability to compensate for different grain cart sizes or header widths.

An unloading system as described above typically includes an unloading auger or and unloading conveyor. Unloading augers are more common, while unloading belt conveyors are becoming more common since they have a higher flow rate capacity which can be important with the ever increasing size of harvesters. Regardless of whether the unloading system is an auger or belt conveyor based system, the inlet end is submersed in the grain and the unloading operation takes place at full rate all of the time. There is no way to control the unload rate, and thus as crops and conditions change, the true unload rate varies and cannot be adjusted. If the unload rate is too high, then overloading of the unloading system structure can occur, especially in long and ultra-light unloading systems. This is especially true in rough ground, where undue forces can be applied to the cantilevered unloading system. On the other hand, as the size of harvesters continue to increase, a decreased unload rate which is under the capacity of the unloading system can result in decreased productivity and loss of profit.

What is needed in the art is an unloading system for an agricultural harvester which allows the unloading system to be run at maximum capacity, while avoiding physical damage to the unloading system from an overload condition.

SUMMARY OF THE INVENTION

The invention in one form is directed to an agricultural harvester, including a support frame and a hopper coupled to the support frame. The hopper is configured to store an agricultural product during a harvesting operation. An unloading system is coupled to the support frame. The unloading system is configured to transport agricultural product received from the hopper to an off-machine location. The unloading system includes a metering gate, a transfer conveyance, at least one sensor, and an electrical processing circuit. The metering gate is positioned near a bottom of the hopper and in communication with an interior of the hopper. The transfer conveyance has an inlet end and a discharge end. The inlet end is in communication with the metering gate. The at least one sensor provides an output signal representing an operating parameter associated with an unload rate of agricultural product through the transfer conveyance during an unloading operation. The electrical processing circuit is coupled to the metering gate and the at least one sensor. The electrical processing circuit controls a position of the metering gate, dependent upon the output signal.

The invention in another form is directed to an unloading system for an agricultural harvester, including a metering gate positionabie for communication with a bottom of a temporary storage hopper on the agricultural harvester. A transfer conveyance has an inlet end and a discharge end. The inlet end is in communication with the metering gate. At least one sensor provides an output signal representing an operating parameter associated with an unload rate of agricultural product through the transfer conveyance during an unloading operation. An electrical processing circuit is coupled to the metering gate and the at least one sensor. The electrical processing circuit controls a position of the metering gate, dependent upon the output signal.

DETAILED DESCRIPTION OF THE INVENTION

Figure 1:
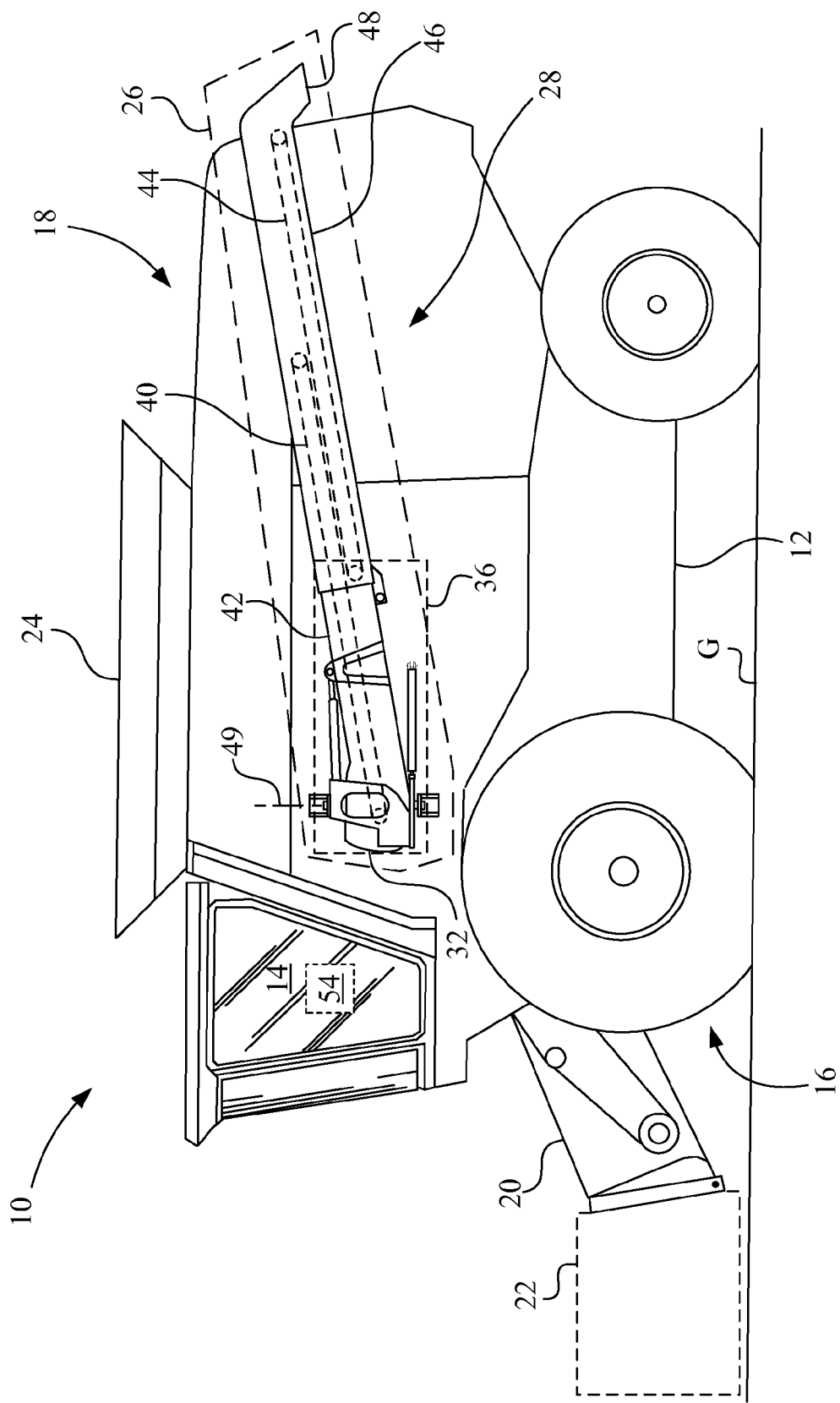
FIG. 1 is a side view of an agricultural harvester including an embodiment of an unloading system of the present invention.
Figure 2:
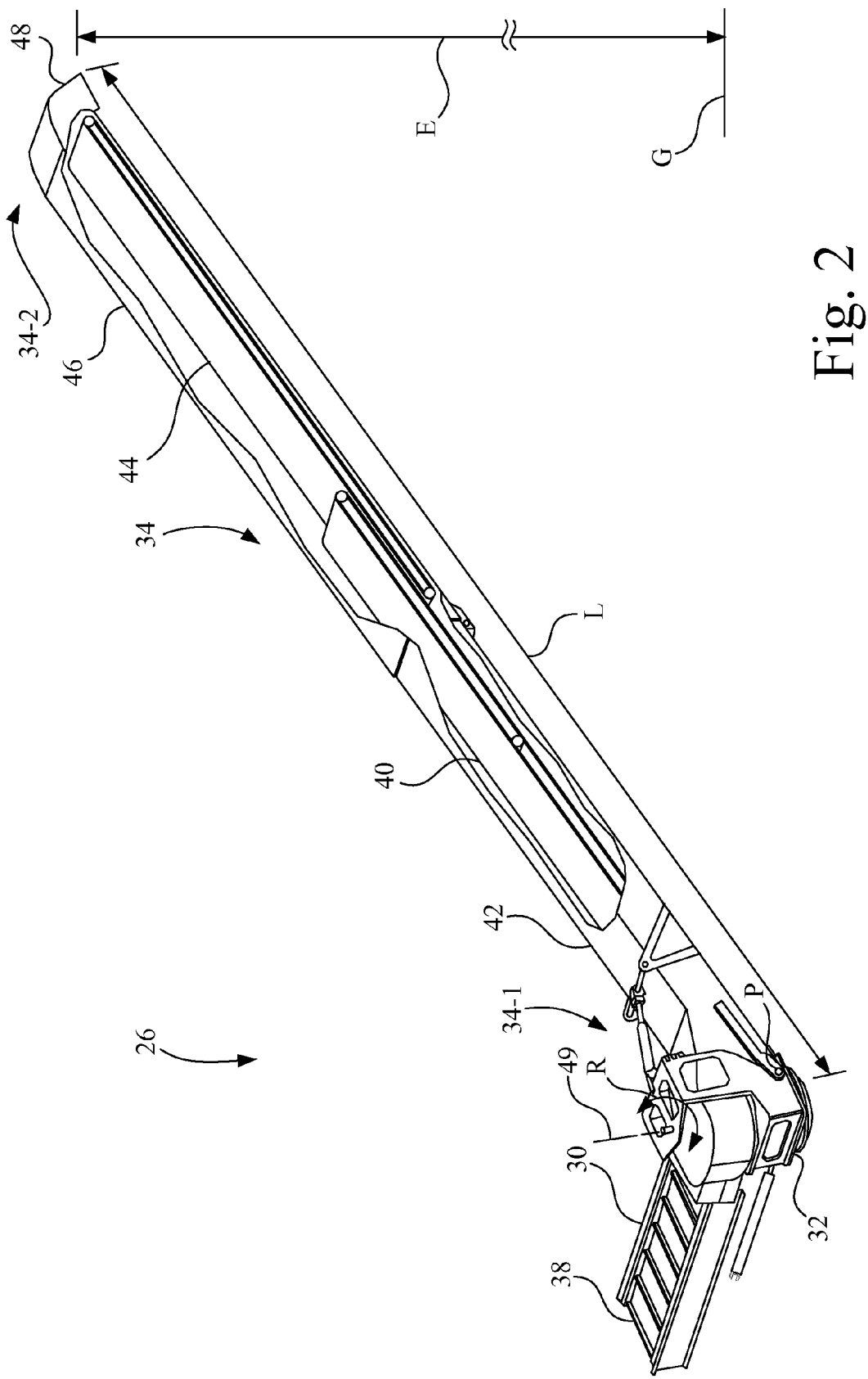
FIG. 2 is a perspective view of the unloading system shown in FIG. 1.

Referring now to the drawings, and more particularly to FIGS. 1 and 2, there is shown a work machine 10 in the form of a self-propelled agricultural harvester or combine that includes a supporting structure with a support frame 12. An elevated operator's station 14 is coupled to support frame 12 at the front of work machine 10. A propulsion unit 16, which may include an engine and drive train, tires and/or tracks that engage the ground G, is coupled to support frame 12, and performs propulsion and/or steering functions. As used herein, the term "coupled" refers to either of direct or indirect attachment. A harvesting assembly 18 is coupled to support frame 12, and is configured to perform harvesting functions (e.g., cutting and/or gathering, threshing, separating, cleaning, and transfer).

Harvesting assembly 18 may include a feeder housing 20, a harvesting platform 22 attached to feeder housing 20 (i.e., header, shown schematically in dashed lines), a hopper 24, and an unloading system 28. Header 22 may be configured in a known manner to cut and/or gather the crop being harvested, which is transferred to threshing, separating and cleaning assemblies (not shown) of harvesting assembly 18 that separate the agricultural product, e.g., grain, from the non-grain product, e.g., chaff. Hopper 24 is configured to receive and store the agricultural product during harvesting operations.

Unloading system 28 is configured to receive the agricultural product from hopper 24 and is configured to transfer the agricultural product received in hopper 24 from work machine 10 to an off-machine location. In FIG. 1, unloading system 28 is depicted in a stowed, i.e., home, position 28.

Unloading system 28 defines a transfer conveyance in the form of an extensible belt conveyor system. Unloading system 23 may include a first stage delivery system 3D, a turret 32, a telescopic second stage transfer assembly 34, and a positioning system 36. First stage delivery system 30 is positioned at the bottom of or below hopper 24, and is configured to receive the agricultural product from hopper 24 and convey it to second stage transfer assembly 34. In the present embodiment, first stage delivery system 30 employs a conveyor belt 38 to transport the agricultural product, although if will be understood that other systems for conveying materials may be employed, e.g., auger-based systems.

Second stage transfer assembly 34 has a proximal end 34-1 and a distal end 34-2. Second stage transfer assembly 34 may include a base conveyor (e.g., belt) system 40, a base support structure 42, an extension conveyor (e.g., belt) system 44, an extension structure 48, and a discharge chute 48. Discharge chute 48 is located at distal end 34-2 of second stage transfer assembly 34. It is considered that in other embodiments, auger-based systems may be employed instead of and/or in addition to conveyor belt systems, in any event, second stage transfer assembly 34 is configured to receive the agricultural product from first stage delivery system 30, and to unload the agricultural product from work machine 10 to an off-machine location by discharging it to an agricultural product carrier via discharge chute 48.

in the illustrated embodiment, second stage transfer assembly 34 may be a telescopic assembly that is configured to selectively move in three ranges of motion, i.e., elevation E, length L, and rotation R so as to position discharge chute 48 at a desired unload position (elevation E, length L, and rotational position RP). It is contemplated, however, that some embodiments may include less that all three of these ranges of motion. In the present embodiment, stowed (home) position 28 for second stage transfer assembly 34 may be in terms of a predefined length L, a predefined elevation E and a predefined rotational position RPn of second stage transfer assembly 34.

Turret 32 is configured to facilitate rotation, and is coupled to support frame 12 of work machine 10. More particularly, turret 32 is configured to rotatably couple second stage transfer assembly 34 at proximal end 34-1 to supporting structure 12 of work machine 10, for example, so as to permit second stage transfer assembly 34 to rotate through rotation R about an axis 49, e.g., a substantially vertical axis, from stowed position 28 to a desired rotational position.

Base conveyor system 40 of second stage transfer assembly 34 is configured to convey the agricultural product away from first stage delivery system 30 and turret 32, and toward discharge chute 48. Extension conveyor system 44 is configured to extend the reach of unloading system 28 beyond that of base conveyor system 40, and is configured to receive the agricultural product from base conveyor system 40 and to convey the agricultural product away from base conveyor system 40 and into discharge chute 48.

Base support structure 42 is pivotably coupled to turret 32 at proximal end 34-1 via a pivot joint P so as to allow second stage transfer assembly 34 to pivot up or down in order to change the elevation E of (i.e., raise or lower) discharge chute 48, in addition, base support structure 42 is configured to support at least in part base conveyor system 40. For example, one end of base conveyor system 40 may be supported directly by turret 32, whereas the other end of base conveyor system 40 may be supported by base support structure 42.

Extension structure 48 supports extension conveyor system 44, and hence is slidably attached to base support structure 42 and configured to extend from base support structure 42, e.g., in a manner somewhat similar to that of an extension ladder, which provides second stage transfer assembly 34 with telescopic capability.

For further details of an extensible belt conveyor system as described above, reference is hereby made to pending U.S. patent application Ser. No. 12/189,805, entitled "AGRICULTURAL WORK MACHINE HAVING AN UNLOADING SYSTEM FOR UNLOADING AN AGRICULTURAL PRODUCT", which is assigned to the assignee of the present invention and incorporated herein by reference.

Figure 3:
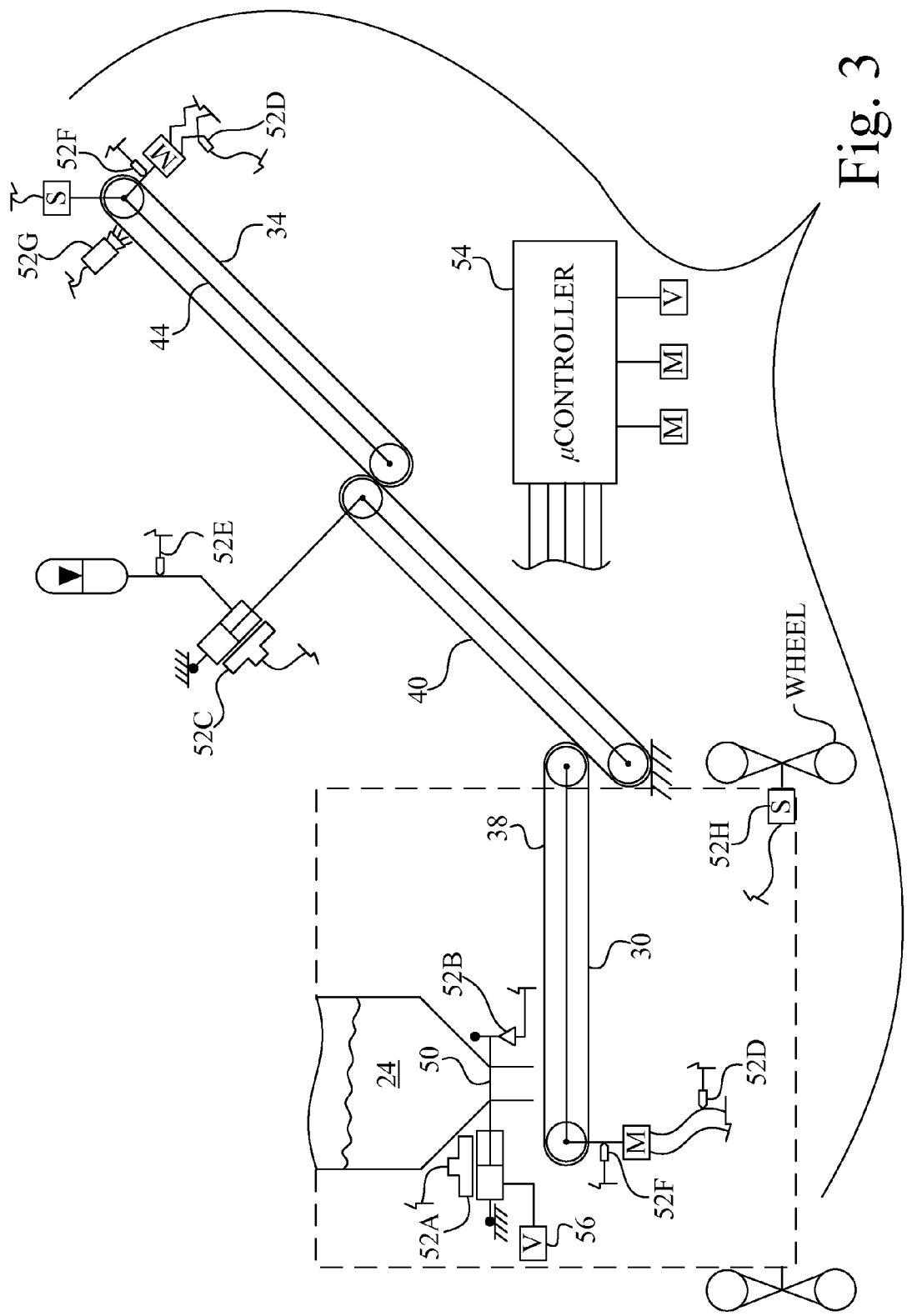
FIG. 3 is a schematic, elevational view of the unloading system shown in FIGS. 1 and 2.

Referring now to FIG. 3, and according to an aspect of the present invention, there is shown a schematic illustration of unloading system 28 within combine 10. In addition to the extensible belt conveyor system described above, unloading system 28 also includes a metering gate 50 and one or more sensors 52. Metering gate 50 is positioned near a bottom of hopper 24 in communication with an interior of hopper 24.

Sensors 52 are positioned in association with respective components that can have an affect on the maximum or desired flow rate of agricultural product through unloading system 26. Sensors 52 are coupled with and provide respective output signals to an electrical processing circuit 54. The output signals from sensors 52 represent an operating parameter associated with an unload rate of agricultural product through unloading system 28 during an unloading operation. For example, the operating parameters) associated with a respective sensor(s) 52 can correspond to:

a position of metering gate 50 (sensor 52A);

a mechanical load applied to metering gate 50 (sensor 52B);

a position of the transfer conveyance (e.g, deflection of second stage transfer assembly 34 (sensor 52C);

an electrical load associated with a drive motor of the transfer conveyance (sensor 52D);

a fluid pressure of a lift cylinder associated with the transfer conveyance (sensor an operating speed of the transfer conveyance (e.g, sensor 52F);

a scanned amount of the agricultural product carried by the transfer conveyance (e.g., an optical scanner (sensor 52G); and a terrain over which the agricultural harvester traverses (e.g., an accelerometer attached to support frame 12 (sensor 52H).

Electrical processing circuit 54 is positioned on combine 10 at any suitable location, such as within operator's station 14 at any convenient location (See, FIG. 1). In the illustrated embodiment, electrical processing circuit 54 is preferably integral with a vehicle control unit (VCU) located within operator's station 14. Electrical processing circuit 54 is coupled with an actuating valve 58 forming part of metering gate 50. Electrical processing circuit 54 is also coupled with sensor(s) 52 described above. Electrical processing circuit 54 controls a position of metering gate 50, dependent upon the output signal(s) from sensor(s) 52, to effect a predetermined flow rate of the agricultural product through unloading system 28.

Figure 4:
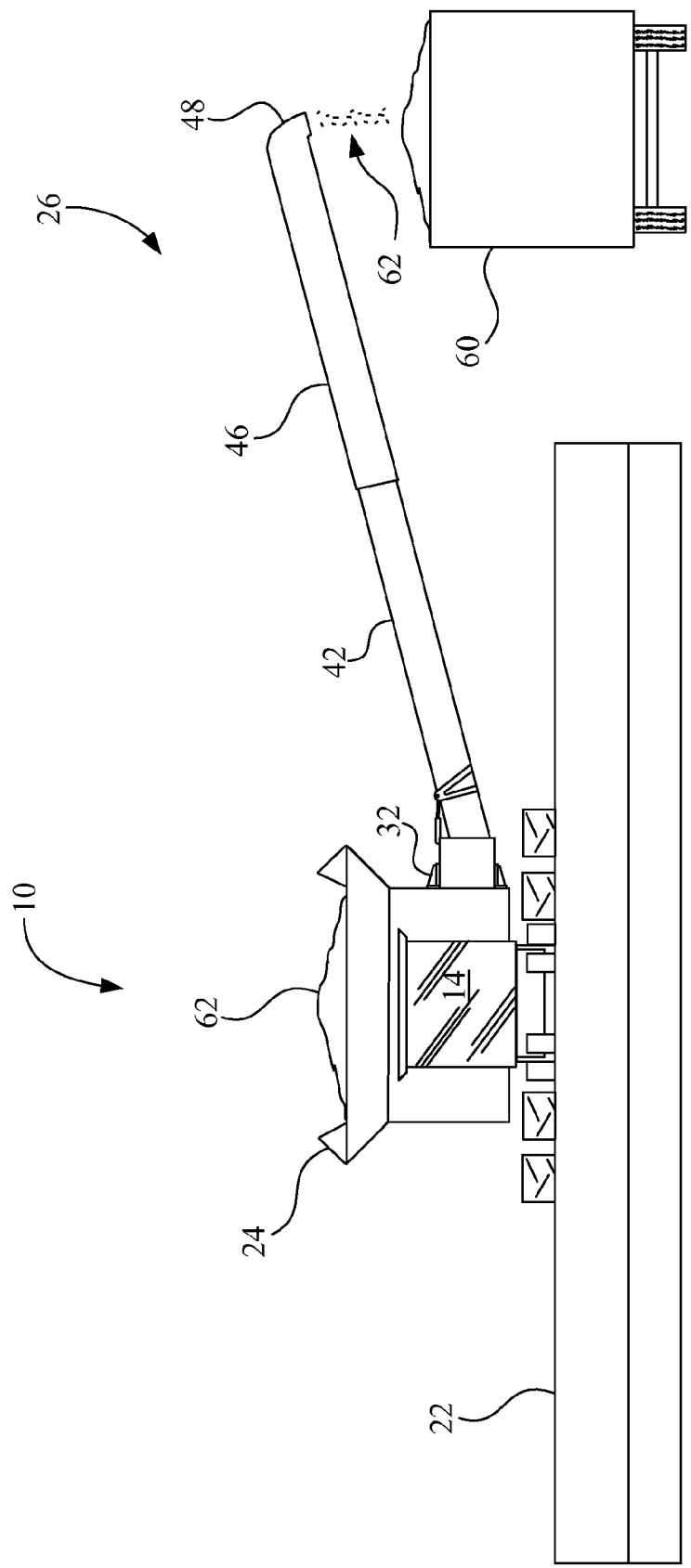
FIG. 4 is a front view of the agricultural harvester shown in FIG. 1 while operating the unloading system to unload agricultural product from the harvester.

During an unloading operation (FIGS. 3 and 4), once discharge chute 48 is appropriately positioned over mobile agricultural product carrier 60, conveyor belt 38 of first stage delivery system 30 is engaged. Grain 82 from hopper 24 falls through metering gate 50 onto conveyor belt 38 and is transported towards base conveyor system 40 of second stage transfer assembly 34. Base conveyor system 40 receives the grain from conveyor belt 38 and conveys it to extension conveyor system 44 of second stage transfer assembly 34. Extension conveyor system 44 then conveys the grain to discharge chute 48, which directs grain 82 downward into mobile agricultural product carrier 60. As the grain 62 is being conveyed, electrical processing circuit 54 receives signals from sensor(s) 52, and controls valve 56 to establish a predetermined, desired and/or maximum flow rate of the grain 82 through unloading system 28.

Having described the preferred embodiment, it will become apparent that various modifications can be made without departing, from the scope of the invention as defined in the accompanying claims.

The invention claimed is:

1. An agricultural harvester, comprising:
a support frame;
a hopper coupled to said support frame, said hopper being configured to store an agricultural product during a harvesting operation; and
an unloading system coupled to said support frame, said unloading system being configured to transport agricultural product received from said hopper to an off-machine location, said unloading system including:
a metering gate positioned near a bottom of said hopper and in communication with an interior of said hopper, the agricultural product falling through said metering gate when said metering gate is opened;
a transfer conveyance having an inlet end and a discharge end, said inlet end in communication with said metering gate;
at least one sensor providing an output signal representing an operating parameter associated with an unload rate of agricultural product through said transfer conveyance during an unloading operation; and
an electrical processing circuit coupled to said metering gate and said at least one sensor, said electrical processing circuit controlling a position of said metering gate, dependent upon said output signal.

2. The agricultural harvester of claim 1, wherein said electrical processing circuit controls a position of said metering gate to effect a predetermined flow rate of the agricultural product through said transfer conveyance, dependent upon said output signal.

3. The agricultural harvester of claim 1, wherein said transfer conveyance includes at least one of an unloading belt conveyor and an unloading auger.

4. The agricultural harvester of claim 1, wherein said transfer conveyance is an extensible unloading belt conveyor.

5. The agricultural harvester of claim 1, wherein said at least one sensor is positioned in association with at least one of said metering gate and said transfer conveyance, said at least one sensor providing an output signal representing an amount of agricultural product being conveyed through said transfer conveyance during an unloading operation.

6. The agricultural harvester of claim 1, wherein said operating parameter associated with said at least one sensor corresponds to at least one of:
a position of said metering gate;
a mechanical load applied to said metering gate;
a position of said transfer conveyance;
an electrical load associated with a drive motor of said transfer conveyance;
an operating speed of said transfer conveyance;
a deflection of said transfer conveyance;
a scanned amount of the agricultural product carried by said transfer conveyance; and
a terrain over which the agricultural harvester traverses.

7. The agricultural harvester of claim 6, wherein said at least one sensor is positioned and configured to sense an optically scanned amount of the agricultural product carried by said transfer conveyance.

8. An unloading system for an agricultural harvester, comprising:
a metering gate positionable for communication with a bottom of a temporary storage hopper on the agricultural harvester;
a transfer conveyance having an inlet end and a discharge end, said inlet end in communication with said metering gate, agricultural product in said temporary storage hopper falling through said metering gate when said metering gate is open;
at least one sensor providing an output signal representing an operating parameter associated with an unload rate of agricultural product through said transfer conveyance during an unloading operation; and
an electrical processing circuit coupled to said metering gate and said at least one sensor, said electrical processing circuit controlling a position of said metering gate, dependent upon said output signal.

9. The unloading system of claim 8, wherein said electrical processing circuit controls a position of said metering gate to effect a predetermined flow rate of the agricultural product through said transfer conveyance, dependent upon said output signal.

10. The unloading system of claim 8, wherein said transfer conveyance includes at least one of an unloading belt conveyor and an unloading auger.

11. The unloading system of claim 8, wherein said transfer conveyance is an extensible unloading belt conveyor.

12. The unloading system of claim 8, wherein said at least one sensor is positioned in association with at least one of said metering gate and said transfer conveyance, said at least one sensor providing an output signal representing an amount of agricultural product being conveyed through said transfer conveyance during an unloading operation.

13. The unloading system of claim 8, wherein said operating parameter associated with said at least one sensor corresponds to at least one of:
a position of said metering gate;
a mechanical load applied to said metering gate;
a position of said transfer conveyance;
an electrical load associated with a drive motor of said transfer conveyance;
an operating speed of said transfer conveyance;
a deflection of said transfer conveyance;
a scanned amount of the agricultural product carried by said transfer conveyance; and
a terrain over which the agricultural harvester traverses.

14. The unloading system of claim 13, wherein said at least one sensor is positioned and configured to sense an optically scanned amount of the agricultural product carried by said transfer conveyance.

* * * * *